Jan. 21, 1941. J. S. LOCKE 2,229,298
LOAD COMPENSATED CONTROL SYSTEM
Filed Nov. 23, 1936 2 Sheets-Sheet 1

James S. Locke, Inventor
By George H. Fisher, Attorney

Jan. 21, 1941.  J. S. LOCKE  2,229,298
LOAD COMPENSATED CONTROL SYSTEM
Filed Nov. 23, 1936   2 Sheets-Sheet 2

Inventor
James S. Locke
By George H. Fisher
Attorney

Patented Jan. 21, 1941

2,229,298

UNITED STATES PATENT OFFICE 2,229,298

LOAD COMPENSATED CONTROL SYSTEM

James Scarth Locke, Minneapolis, Minn., assignor to Minneapolis-Honeywell Regulator Company, Minneapolis, Minn., a corporation of Delaware Application November 23, 1936, Serial No. 112,327

14 Claims. (Cl. 236—78)

This invention relates to load compensation or automatic reset mechanism as applied to a follow-up control system generally and particularly to an electrical type of follow-up control system.

It is an object of this invention to provide a follow-up control system having a device which is adapted to be positioned in a plurality of positions to control the value of the condition, a condition responsive device the state of which is varied in accordance with changes in the value of the condition for positioning said control device to maintain the value of the condition within predetermined limits along with a means for changing the state of the condition responsive device in accordance with changes in load whereby the condition to be controlled is maintained within narrower limits.

The specific construction and manner in which this mode of control is obtained also form objects of this invention.

Figures 1, 2, 3, 4:
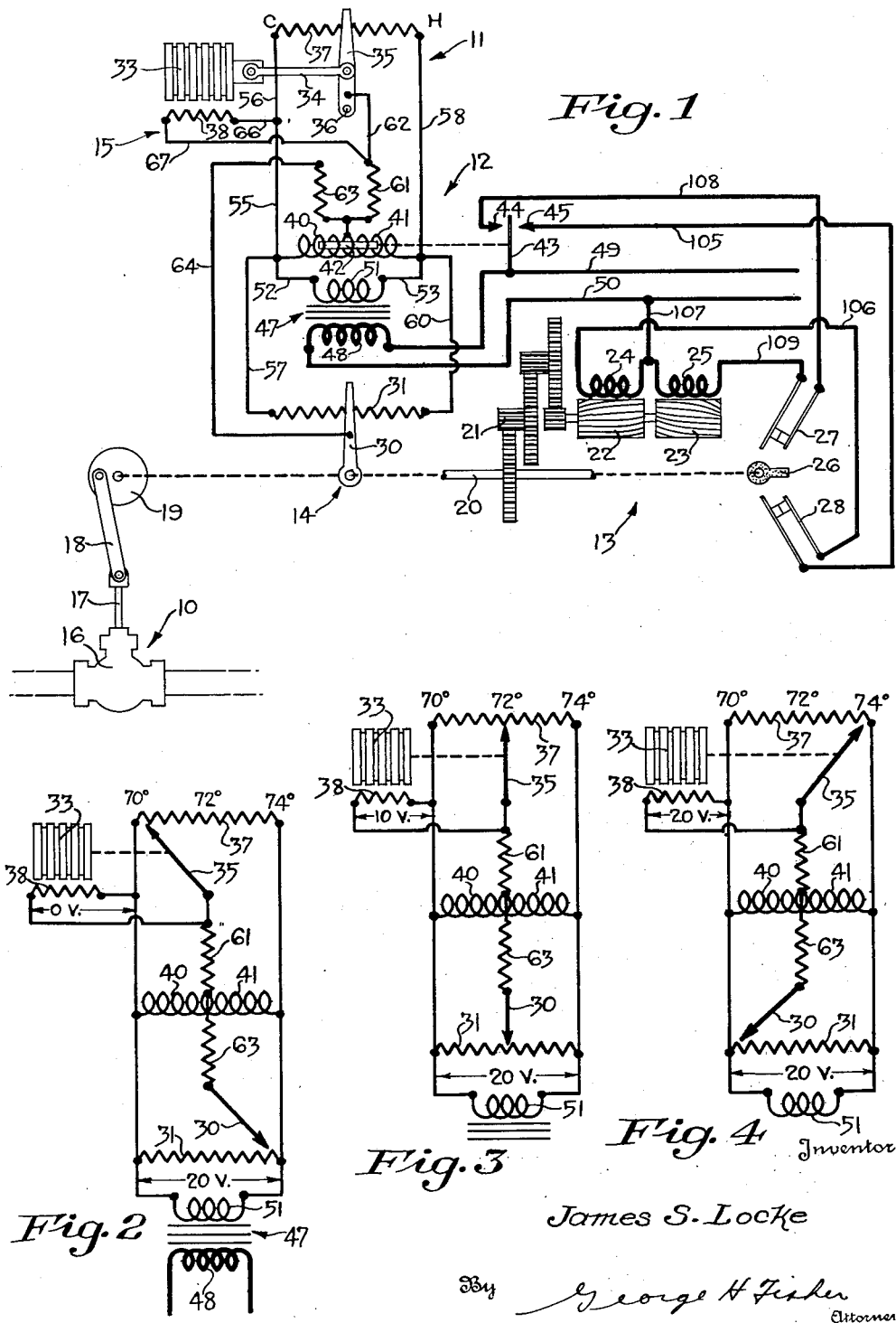
Figure 5:
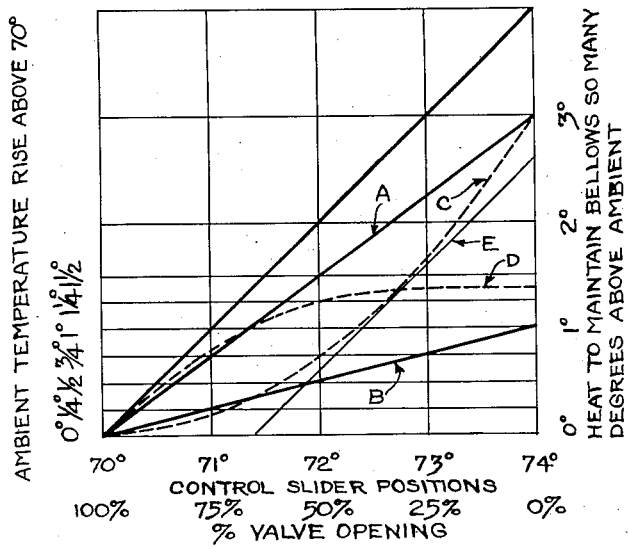

For a more thorough understanding of this invention, reference is made to the accompanying drawings in which:

Figure 1 is a diagrammatic illustration of my control system;

Figures 2, 3, and 4 are diagrammatic illustrations showing the parts in various positions;

Figure 5 is a graph illustrating the operation of the system; and

Figures 6, 7, 8, 9, and 10 show diagrammatically various constructions for obtaining a closer control.

Referring now to Figure 1, 10 generally designates a device to be positioned in a plurality of positions to control the value of a condition. The condition responsive device the state of which is varied in accordance with changes in the value of the condition is generally designated at 11. The condition responsive device operates a normally balanced relay generally designated at 12 which, in turn, controls the operation of a motor generally designated at 13. The motor 13 operates the control device 10 and also operates a follow-up mechanism generally designated at 14 whereby the device 10 is positioned in accordance with variations in the value of the condition to be controlled to maintain the condition within predetermined limits. A load compensation or reset mechanism is generally designated at 15 for varying the state of the condition responsive device 11 so that the value of the condition to be controlled is maintained within narrower limits.

Although the control system may be utilized for controlling the value of any desired condition, it is shown as controlling a temperature condition, such as the temperature of a space. Therefore, the condition controlling device 10 may comprise a valve 16 controlling the supply of heat to the space (not shown). The valve 16 is operated by a valve stem 17 which is connected by a pitman 18 to a crank disc 19 mounted on a shaft 20 of the motor 13. The shaft 20 is operated through a reduction gear train 21 by motor rotors 22 and 23. The motor rotors 22 and 23 are operated by field windings 24 and 25, the arrangement being such that when the field winding 24 is energized the valve 16 is moved toward an open position and when the field winding 25 is energized the valve 16 is moved towards a closed position. The shaft 20 also operates an abutment member 26 preferably made of insulating material for opening limit switches 27 and 28 when the valve 16 is moved to either an extreme open position or an extreme closed position.

The follow-up mechanism generally designated at 14 may comprise a slider 30 operated by the shaft 20 and a balancing potentiometer resistance element 31 adapted to be engaged by the slider 30. The balancing potentiometer formed by the slider 30 and the resistance element 31 performs a balancing function for the relay generally designated at 12 in a manner to be pointed out more fully hereafter.

The condition responsive device generally designated at 11 comprises a thermostatic device 33 which may be of the bellows type containing a volatile fluid. The temperature responsive device 33 operates through a link 34 a slider 35 pivoted at 36. The slider 35 is adapted to slide across a control potentiometer resistance element 37. The arrangement is such that upon an increase in space temperature affecting the thermostatic element 33, the slider 35 is moved to the right in the direction indicated by the character H, and upon a decrease in space temperature, the slider 35 is moved to the left in the direction indicated by the character C.

The reset mechanism generally designated at 15 comprises an auxiliary heater 38 for altering the operation of the thermostatic element 33 and this auxiliary heater 38 is preferably controlled by the slider 35 in a manner to be more fully pointed out hereafter.

The relay mechanism generally designated at 12 comprises relay coils 40 and 41 for influencing an armature 42. The armature 42 is suitably connected to a switch arm 43 which is adapted to engage contacts 44 and 45. When the relay coil 40 is energized more than the relay coil 41, the switch arm 43 is moved into engagement with the contact 44. When the relay coil 41 is energized more than the relay coil 40, the switch arm 43 is moved into engagement with the contact 45. When the relay coils 40 and 41 are equally energized, the switch arm 43 is maintained midway between the coils 44 and 45 and out of engagement with either of these contacts. Power is supplied to the relay 12 by means of a step-down transformer 47 having a primary 48 connected across line wires 49 and 50 and a secondary 51. One end of the secondary 51 is connected by a wire 52 to the left end of the relay coil 40. In a like manner the other end of the secondary 51 is connected by a wire 53 to the right end of the relay coil 41. The other ends of the relay coils 40 and 41 are connected together. By reason of these wiring connections, it is seen that the relay coils 40 and 41 are connected in series and across the secondary 51.

The left end of the relay coil 40 is connected by wires 55, 56 and 57 to the left end of the control potentiometer resistance element 37 and the left end of the balancing potentiometer resistance element 31. In a like manner the right end of the relay coil 41 is connected by wires 58 and 60 to the right end of the control potentiometer resistance element 37 and the right end of the balancing potentiometer resistance element 31. The junction of the relay coils 40 and 41 is connected by a protective resistance 61 and a wire 62 to the slider 35 of the control potentiometer and the junction of the relay coils 40 and 41 is also connected by a protective resistance 63 and a wire 64 to the slider 30 of the balancing potentiometer. From the above wiring connections, it is seen that the control potentiometer and the balancing potentiometer are connected in parallel with the series connected coils 40 and 41, and that the series connected coils 40 and 41, the control potentiometer, and the balancing potentiometer are all connected across the secondary 51 of the step-down transformer 47. The auxiliary heater 38 of the reset mechanism generally designated at 15 is connected by a wire 66 to the junction of wires 55 and 56 and by a wire 67 to the junction of the protective resistance 61 and the wire 62.

Omitting for the time being the function of the auxiliary heater 38, a decrease in space temperature affecting the thermostatic device 33 causes movement of the slider 35 towards the left in the direction indicated by the character C. By reason of the parallel relationship pointed out above, this left-hand movement causes partial short circuiting of the relay coil 40 to decrease the energization thereof and to increase the energization of the relay coil 41. This causes movement of the switch arm 43 into engagement with the contact 45 to complete a circuit from the line wire 49 through switch arm 43, contact 45, wire 105, limit switch 28, wire 106, field winding 24, and wire 107 back to the other line wire 50. Completion of this circuit causes energization of the field winding 24 to move the valve 16 towards an open position. Movement of the valve 16 towards an open position causes right-hand movement of the slider 30 of the balancing potentiometer. This right-hand movement of the slider 30 partially short-circuits the relay coil 41 to decrease the energization thereof and to increase the energization of the relay coil 40. When the slider 30 has moved sufficiently far to the right to rebalance the energization of the relay coils 40 and 41, the switch arm 43 is moved out of engagement with the contact 45 to break the circuit to the field winding 24 whereby further opening movement of the valve 16 is prevented and the valve 16 is held in its newly adjusted position. In this manner, the valve 16 is moved towards an open position in accordance with the amount of change in the space temperature.

Upon an increase in space temperature, the slider 35 of the control potentiometer is moved to the right in the direction indicated by the character H. This causes partial short circuiting of the relay coil 41 to decrease the energization thereof and to increase the energization of the relay coil 40. These unequal energizations of the relay coils 40 and 41 cause movement of the switch arm 43 into engagement with the contact 44 to complete a circuit from the line wire 49 through switch arm 43, contact 44, wire 108, limit switch 27, wire 109, field winding 25, and wire 107 back to the other line wire 50. This circuit energizes the field winding 25 to move the valve 16 towards a closed position. Movement of the valve 16 towards a closed position causes left-hand movement of the slider 30 of the balancing potentiometer. This left-hand movement of slider 30 partially short-circuits the relay coil 40 to decrease the energization thereof and to increase the energization of the relay coil 41. When the slider 30 has moved sufficiently far to the left so as to rebalance the energization of the relay coils 40 and 41, the switch arm 43 is moved out of engagement with the contact 44 to break the circuit through the field winding 25. Operation of the motor 13 is thereupon stopped and the valve 16 is held in its newly adjusted position. In this manner, the valve 16 is moved towards a closed position in accordance with the amount that the space temperature has increased.

By reason of the above follow-up control system, the value of the condition, that is, the space temperature is maintained within predetermined limits. If the control range of the control device 11 is made sufficiently narrow so as to give accurate temperature control, "hunting" of the system is likely to occur. This may be obviated by making the control range of the control device 11 relatively wide, but if such is done, a "drooping" characteristic becomes apparent that is, when the load on the heating system becomes relatively great the temperature maintained within the space is at a relatively low value and when the load on the heating system becomes relatively light the temperature maintained in the space becomes relatively high. With the use of a wide range controller, the differences between these temperatures are in many cases too great.

In order to overcome these undesirable characteristics of the electrically balanced follow-up system, I contemplate using the load compensation or reset mechanism generally designated at 15 which affects the operation of the control device 11 to maintain the condition to be controlled within narrower limits and still prevent "hunting" of the control system. The auxiliary heater 38 forming the reset mechanism 15 is so selected that it has sufficient capacity when fully energized to cause the temperature of the thermostatic element 33 to be raised 3° above the ambient temperature. Also, the thermostatic element 33 is so arranged that a substantial time lag exists between the energization of the heater 38 and the point at which the heat generated by the heater 38 affects the thermostatic element 33.

Referring now to Figures 2, 3, and 4 wherein I have shown diagrammatically the operation of my control system in connection with the reset mechanism, a wide range controller is selected, specifically, a controller having a range of 70° to 74° is utilized. It is assumed that the voltage drop across the transformer secondary 51 is 20 volts. With the parts in the position shown in Figure 2, the slider 35 is in the extreme left and, therefore, the valve 16 is in a wide open position for supplying the maximum amount of heat to the space. When the slider is in the extreme left-hand position, the heater 38 is substantially short-circuited and the voltage drop across the same is substantially zero. It follows then that the thermostatic element 33 has the same temperature as the ambient space temperature. As the ambient space temperature rises slightly, the slider 35 is moved toward the right to move the valve towards a closed position and to increase the voltage drop across the heater 38. This increase in voltage drop across the heater 38 causes energization of the same to supply heat to the bellows 33 to raise the temperature of the bellows slightly above ambient. This increase in bellows temperature causes further righthand movement of the slider 35 to move the valve further towards a closed position and to increase further the voltage drop across the heater 38. As pointed out above, the heater 38 is so designed that it will supply sufficient heat to the bellows 33 to maintain the temperature of the bellows 3° above ambient temperature when the heater 38 is operated at its maximum capacity. The heater 38 is operated at its maximum capacity when the slider 35 is moved to the 74° position. For purposes of illustration, it is assumed for the present that the rate of heat supplied to the bellows 33 increases in a straight line relationship as the slider 35 is moved from the 70° position to the 74° position.

With this straight line relationship when the ambient temperature reaches 70½° the voltage drop across the heater 38 is increased and sufficient heat is generated in the heater to cause ⅜° temperature rise of the bellows 33 above ambient. This in turn causes the slider to move to the 70⅞° position which in turn causes a greater voltage drop across the heater 38 and additional heat input to the bellows 33. As the temperature of the bellows increases above ambient the rate of heat loss of the bellows increases as does also the rate of heat input to the bellows from the heater. But by proper design of the heater the rate of increase of heat loss from the bellows may be made greater than the rate of increase of heat input to the bellows. Therefore, for a given ambient temperature between 70 and 71 the actual bellows temperature attained will be determined by the bellows temperature at which the rate of heat loss is just equal to the rate of heat input to the bellows. In this case the balance temperature of the bellows will be 72°. At this point the heater is delivering half of the maximum amount of heat which it is capable of delivering sufficient heat to cause the temperature of the bellows to be 1½° above the ambident temperature which is 70½°. The slider 35, therefore assumes a 72° position for a 70½° ambient temperature.

In the same way an ambient temperature of 71° will cause the bellows to assume a temperature of 74° which moves the slider 35 to the extreme right-hand or 74° position. It follows then that as the ambient temperature rises from 70° to 71°, the slider 35 of the control potentiometer is moved proportionately from the 70° to the 74° position. A 1° change in ambient temperature therefore causes a 4° change in slider position. This system then maintains the ambient temperature between 70° and 71° although the slider 35 is moved from the 70° to the 74° position. By reason of this construction, a wide range control potentiometer may be utilized to prevent "hunting" and still the effective control thereof is maintained within narrower limits, specifically, between 70° and 71°. Since the control range is maintained within 1°, the "droop" of the system becomes negligible.

Since a thermal lag exists between the time of changing of the energization of the heater 38 and the time when this heat is effective on the bellows 33 to move the slider 35, the control potentiometer is not reset immediately but a time lag is provided in the reset. Therefore, for relatively slow changes in ambient temperatures the slider will be moved a relatively great amount and "hunting" will not occur. However, since a wide differential controller is utilized, this wide differential causes operation of the valve upon the occurrence of rapid changes in ambient temperature conditions without "hunting."

The above mode of operation was predicated on the fact that the rate of heat input to the bellows 33 by the heater 38 varied in a straight line relationship with the voltage drop and, consequently, the positions of the control slider. Such operation is graphically shown in Figure 5 wherein the straight line curve A shows the theoretical heat supply required to maintain the bellows a given number of degrees above the ambient temperature. As shown in this graph, when the slider is in the 74° position, the bellows is maintained 3° above the ambient temperature and since the ambient temperature is 71° for this slider position, the temperature of the bellows is substantially 74°. Likewise, for a 73° position of the slider 35, sufficient heat is supplied to maintain the temperature of the bellows 33 substantially 2¼° above ambient. Also, when the slider is in the 72° position, the temperature of the bellows is maintained substantially 1½° above the ambient temperature.

The straight line curve B is obtained by taking the slider position and subtracting therefrom the amount of heat added by the heater to the bellows 33 to get the resulting ambient temperature condition. The curve B is, therefore, a straight line which indicates the slider position with respect to the ambient temperature. The curves A and B are the theoretic curves which it is desired to obtain for the accurate operation of the control system. The system will operate correctly as long as the slope of curve A is less than the slope of the curve of rate of heat loss from the bellows for any given temperature. The slope of the curve of the rate of heat loss from the of the curve of the rate of heat loss from the bellows for an increase above the ambient temperature is one, as shown in Figure 5.

In the above discussion of my control system, the capacity of the heater was assumed to be sufficient to maintain the temperature of the bellows 3° above ambient when it was fully energized. This gave a 1° differential control, that is, the space temperature was maintained between 70° and 71°. If it be desired to decrease the effective differential, say to ½° whereby the space temperature would be maintained between 70° and 70½°, the heater 38 may be so selected as to maintain the temperature of the bellows 3½° above ambient when the slider is in the 74° position. If a still more accurate control is desired, the capacity of the heater 38 may be increased and, taking an extreme example, if the capacity of the heater were so increased that it would maintain the temperature of the bellows 3.99° above ambient when the slider is in the 74° position, an extremely accurate temperature control may be obtained. With these values the operating differential would be .01 of a degree. Also, if it is desired to widen the effective control differential, the heater may be selected to supply for example, 2° of heat to the bellows to maintain the bellows 2° above the ambient temperature when the slider is in the 74° position. If such a heater is used, the effective control differential is increased to 2° and the space temperature will be maintained within 70° to 72°. Therefore, it follows that by properly selecting the heater 38 any desired effective differential of control may be obtained.

It is known that the heat output of a heater resistance does not vary in a straight line relation with the voltage drop across the resistance but varies as the square of the voltage drop. Therefore, if an ordinary heater of the type shown in Figures 1 to 4 is utilized and this heater is designed to supply heat to the bellows 33 at such a rate as to maintain the bellows temperature 3° above ambient when the slider is in the 74° position, it will not supply the same proportionate amount of heat to the bellows when the slider is in the intermediate positions. The amount of heat actually supplied by a conventional heater for a given slider position is graphically illustrated in Figure 5 by the dotted (exponential) curve C. The curve D is derived from the curve C in exactly the same manner as the curve B was derived from the curve A, that is, by taking the slider position and subtracting therefrom the amount of heat actually added by the heater to the bellows. Therefore, the curve D indicates the actual slider position with respect to the ambient temperature when a conventional heater resistance element is utilized. From this curve, it is seen that when the ambient temperature rises from 70° to 70½°, the slider position will be substantially 70½° instead of 72° which is the theoretic position. Likewise, when the ambient temperature rises to 71°, the slider position will be 71½° instead of the theoretic 74° position. When the ambient temperature rises to substantially 71⅜°, the slider will assume a position of substantially 72¾° and since at this point the rate of heat input by the heater to the bellows is greater than the rate of heat loss from the bellows, a "snowballing" effect is brought about to immediately carry the slider to the extreme 74° position. It is noted that at this point the slope of the curve C becomes greater than 1 which is the reason for this "snowballing" effect. Therefore, control of the system is lost when the slider is moved to a 72½° position by a rise of ambient temperature to substantially 71¾°. This is all brought about by reason of the fact that the rate of heat input to the bellows is relatively low when the slider is in the left-hand position and is relatively high when the slider is in the right-hand position, the rate increasing as the square of the voltage drop across the heater resistance.

In order to obviate these detrimental effects and to provide an accurate control system, some means must be provided for increasing the rate of heat supply when the slider is at the left-hand portion of the control potentiometer and decreasing the rate of heat supply when the slider is at the right-hand portion of the control potentiometer. To make the curve C more closely resemble the curve A, various constructions illustrated in Figures 6 to 10 may be utilized for accomplishing the desired result.

Figure 6:
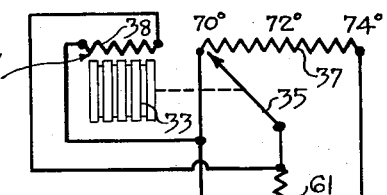

In Figure 6 the heater 38 may be located above the bellows 33 so that as the voltage drop across the heater increases the heat given off by the heater causes a "chimney" effect to decrease the actual heat supplied to the bellows as the voltage drop increases. Stated in another way, the location of the heater 38 above the bellows increases the flow of air over the bellows 33 to carry away a portion of the heat generated by the heater 38 as the energization of the heater 38 is increased. This causes a flattening of the curves C and D to make them more nearly coincide with the curves A and B whereby accurate operation of the control system is obtained.

A special type of resistance may be utilized in which the effective resistance is increased as the resistance temperature increases, the heating effect of this type of resistance may vary in direct proportion to the voltage drop across the heating element. Such a heating element is designated at 38X in Figure 7 and, therefore, this heating element may be located in any desired position with respect to the bellows 33. Since the rate of heat supplied by the heater 38X bears a straight line relationship with the voltage drop across the same, the curves C and D of Figure 5 are flattened to make them more closely correspond to the curves A and B to accomplish an accurate control.

Figure 8:
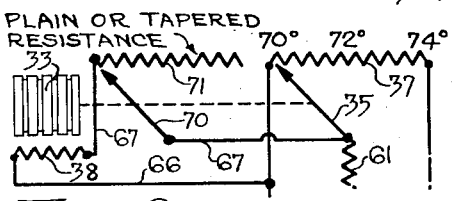

In Figure 8, a variable resistance comprising a slider 70 and a resistance element 71 connected in series with the heater 38 is shown for the purpose of flattening the curves C and D to make them more closely resemble the curves A and B. The slider 70 is operated by the bellows 33 in exactly the same manner as the slider 35 is operated. This variable resistance may be included in the wire 67 which connects the heater 38 to the protective resistance 61. The arrangement is such that as the bellows temperature increases to move the slider from the 70° position to the 74° position, it also increases the resistance in series with the heater 38. This causes flattening of the curve C to make it more closely align with the curve A. If a tapered variable resistance is utilized and the amount of tapering be correctly designed, the curve C may be made to follow exactly in line with the curve A to obtain the desired theoretic control result.

Figures 7, 9:
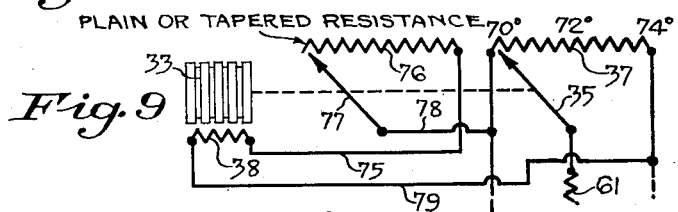

Figure 9 discloses an arrangement somewhat similar to Figure 8 with the exception that the heater 38 is connected across both series connected relay coils 40 and 41. Specifically, one end of the heater 38 is connected by a wire 75, a variable resistance 76, a slider 77 and a wire 78 to the left-hand end of the relay coil 40 and the left-hand end of the heater 38 is connected by a wire 79 to the right-hand end of the relay coil 41. The slider 77 is operated by the bellows 33. Since the voltage drop across the series connected relay coils 40 and 41 is constant at all times, the voltage drop across the heater 38 and the variable resistance 76 is also constant at all times. With the parts in the position shown in Figure 9, the voltage drop across the heater 38 is at a minimum since the resistance value of the variable resistance in series therewith is at the maximum value. Further, the current flow in the circuit is at a minimum. Therefore a minimum amount of heat is being supplied to the heater 33. As the ambient temperature increases to move the sliders 77 and 35 to the right, the resistance in series with the heater 38 is decreased and therefore the heating effect thereof is increased. By suitably selecting the correct resistance 76, the curve C of Figure 5 may be flattened to more closely parallel the curve A. Also, if a tapered resistance 76 is utilized, the curve C may be made to fall directly parallel to the curve A and therefore the system of Figure 9 may be made to operate in accordance with the theoretic mode of operation.

Figure 10:
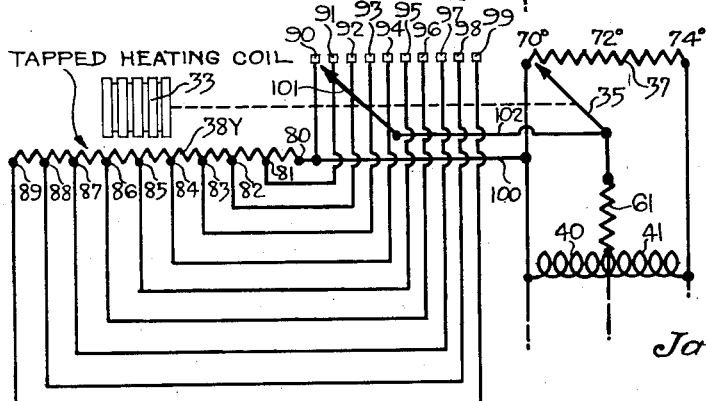

Figure 10 discloses another manner for accomplishing the theoretic mode of operation. This system of Figure 10 utilizes a tapped heating coil 38Y in lieu of the plain heater 38 of Figures 1 to 4. This tapped heating coil 38Y may comprise a plurality of taps 80 to 89, inclusive, and connected with each of these taps 80 to 89, respectively, are contacts 90 to 99, inclusive. The contact 90 and the tap 80 are connected by a wire 100 to the left-hand end of the relay coil 40. A slider 101 operated by the thermostatic element 33 is adapted to engage the contacts 90 to 99, inclusive, and this slider is connected by a wire 102 to the protective resistance 61. With the parts in the position shown in Figure 10, the slider 101 is engaging the contact 90 whereby no heat is being supplied by the tapped heating coil 38Y to the thermostatic element 33. This position corresponds to the position of the parts of Figure 2. As the ambient temperature rises, sliders 101 and 35 are moved to the right and the slider 101 sequentially engages the contacts 90 to 99, inclusive. By properly locating the taps on the tapped heating element 38Y, the curve C may be made to fall directly in line with the curve A whereby the theoretic mode of operation is obtained by the construction shown in Figure 10.

The above control systems may be equally as well applied to the control of cooling systems as well as heating systems and all that is necessary to so adapt these control systems for controlling cooling systems is to reverse the connections of the control potentiometer to the balanced relay, specifically, the left-hand end of the control potentiometer should be connected to the right-hand end of the relay coil 41 and the right-hand end of the control potentiometer should be connected to the left-hand end of the relay coil 40. If the same temperature settings are utilized, the temperature may be maintained between 70° and 71° even though the system be used for winter heating or for summer cooling, that is, the effective control range is maintained in the lower end of the scale range regardless of whether the system is used for winter heating or for summer cooling.

From the above it is seen that I have provided a control system of the follow-up type wherein the condition to be controlled is maintained within narrow limits and wherein "hunting" of the control system is prevented. This control system also compensates for changes in load and substantially eliminates the "drooping" characteristics of a follow-up system. The system also operates on rapid changes in load to give a minimum amount of reset and operates on slow changes in load to give a maximum amount of reset. Therefore, this system is highly useful in the control of a condition wherein rapid changes in load are not of a permanent nature.

Although for purposes of illustration, I have used various temperature and voltage values they are not to be construed in a limiting sense. Inasmuch as several forms of this invention for accomplishing the desired results have been disclosed, other forms thereof may become obvious to those skilled in the art upon a review of this specification and, therefore, this invention is to be limited only by the scope of the appended claims and prior art.

I claim as my invention:

1. In combination, a device to be positioned in a plurality of positions to control the value of a condition, condition responsive means the state of which is varied in accordance with changes in the value of the condition, means controlled by said condition responsive means to position said device in accordance with changes in the state of the condition responsive means whereby the value of the condition is maintained within certain limits, and means more responsive to slow changes than rapid changes in the value of the condition to be controlled for additionally changing the state of the condition responsive means in equal amounts for each equal change in its state to maintain the condition to be controlled within narrower limits without hunting.

2. In a temperature control system, the combination of, a device for controlling the temperature to be controlled, a thermostat responsive to changes in the temperature to be controlled for controlling said device to maintain the temperature to be controlled substantially at a desired normal value, auxiliary heating means for heating the thermostat, and means for changing the heating effect of the auxiliary heating means the same amount for each equal increase in the amount of deviation of the temperature to be controlled from the desired normal value.

3. In a temperature control system, the combination of, a device for controlling the temperature to be controlled, a thermostat responsive to changes in the temperature to be controlled for controlling said device to maintain the temperature to be controlled substantially at a desired normal value, auxiliary heating means for heating the thermostat, and resistance means directly operated by the thermostat for changing the heating output of the auxiliary heating means the same amount for each equal increase in the amount of deviation of the temperature to be controlled from the desired normal value.

4. In combination, a device to be positioned in a plurality of positions for controlling the value of a condition, control impedance means the value of which is varied in accordance with changes in the value of the condition, relay means for controlling the operation of the device, connections between the relay means and the control impedance means for maintaining the value of the condition to be controlled within certain limits, and means responsive to the current flow through the connections for varying the impedance value of the control impedance means with respect to the value of the condition to be controlled to maintain the condition to be controlled within narrower limits.

5. In combination, a device to be positioned in a plurality of positions for controlling the value of a condition, control impedance means the value of which is varied in accordance with changes in the value of the condition, relay means for controlling the operation of the device, connections between the relay means and the control impedance means for maintaining the value of the condition to be controlled within certain limits, and means controlled by the control impedance means for varying the impedance value of the control impedance means with respect to the value of the condition to be controlled to maintain the condition to be controlled within narrower limits.

6. In a temperature control system, a device to be positioned in a plurality of positions for controlling the temperature to be controlled, a resistance element, a slider cooperating therewith, thermostatic means responsive to the temperature to be controlled for operating the slider, normally balanced relay means for controlling the operation of the device, connections between the resistance element, the slider and the normally balanced relay means for positioning said device in accordance with the position of the slider with respect to its resistance element whereby the temperature to be controlled is maintained within certain limits, and auxiliary heating means for heating said thermostatic means controlled by said slider for maintaining the temperature to be controlled within narrower limits.

7. In a temperature control system, a device to be positioned in a plurality of positions for controlling the temperature to be controlled, a resistance element, a slider cooperating therewith, thermostatic means responsive to the temperature to be controlled for operating the slider, normally balanced relay means for controlling the operation of the device, connections between the resistance element, the slider and the normally balanced relay means for positioning said device in accordance with the position of the slider with respect to its resistance element whereby the temperature to be controlled is maintained within certain limits, auxiliary heating means for heating the thermostatic means, and variable resistance means adjusted by the thermostatic means for controlling the auxiliary heating means to maintain the temperature to be controlled within narrower limits.

8. In a temperature control system, a device to be positioned in a plurality of positions for controlling the temperature to be controlled, a resistance element, a slider cooperating therewith, thermostatic means responsive to the temperature to be controlled for operating the slider, normally balanced relay means for controlling the operation of the device, connections between the resistance element, the slider and the normally balanced relay means for positioning said device in accordance with the position of the slider with respect to its resistance element whereby the temperature to be controlled is maintained within certain limits, and auxiliary heating means for heating the thermostatic means controlled by the slider and the thermostatic means for maintaining the temperature to be controlled within narrower limits.

9. In a temperature control system, a device to be positioned in a plurality of positions for controlling the temperature to be controlled, a resistance element, a slider cooperating therewith, thermostatic means responsive to the temperature to be controlled for operating the slider, normally balanced relay means for controlling the operation of the device, connections between the resistance element, the slider and the normally balanced relay means for positioning said device in accordance with the position of the slider with respect to its resistance element whereby the temperature to be controlled is maintained within certain limits, and auxiliary heating means for heating said thermostatic means controlled by said slider for maintaining the temperature to be controlled within narrower limits, said auxiliary heating means being located above said thermostatic means whereby the heating effect thereof on the thermostatic means increases at a slower rate than the heating of the auxiliary heating means.

10. In a temperature control system, a device to be positioned in a plurality of positions for controlling the temperature to be controlled, a resistance element, a slider cooperating therewith, thermostatic means responsive to the temperature to be controlled for operating the slider, normally balanced relay means for controlling the operation of the device, connections between the resistance element, the slider and the normally balanced relay means for positioning said device in accordance with the position of the slider with respect to its resistance element whereby the temperature to be controlled is maintained within certain limits, a tapped heating resistance for heating the thermostatic means, and a switching mechanism controlled by the thermostatic means for controlling the taps of the heating resistance to maintain the temperature to be controlled within narrower limits.

11. In combination, a device to be positioned in a plurality of positions to control the value of a condition, condition responsive means the state of which is varied in accordance with changes in the value of the condition, means, including follow up means operated by the device, controlled by said condition responsive means to position said device in accordance with changes in the state of the condition responsive means whereby the value of the condition is maintained within certain limits, means for changing the state of the condition responsive means, and means for varying the changing effect of the last mentioned means in accordance with the amount of deviation of the condition to be controlled from the desired normal value to maintain the condition to be controlled within narrower limits.

12. In combination, a device to be positioned in a plurality of positions to control the value of a condition, condition responsive means the state of which is varied in accordance with changes in the value of the condition, means, including follow up means operated by the device, controlled by said condition responsive means to position said device in accordance with changes in the state of the condition responsive means whereby the value of the condition is maintained within certain limits, means for changing the state of the condition responsive means, and means controlled by the condition responsive means for varying the changing effect of the last mentioned means in proportion to the amount of deviation of the condition to be controlled from the desired normal value to maintain the condition to be controlled within narrower limits.

13. In a temperature control system, the combination of, a device to be positioned in a plurality of positions for controlling the value of the temperature to be controlled, thermostatic control means the state of which is varied in accordance with changes in the value of the temperature to be controlled, means, including follow up means operated by the device, controlled by said thermostatic control means to position said device in accordance with changes in the state of the thermostatic control means whereby the value of the temperature to be controlled is maintained within certain limits, auxiliary heating means for heating the thermostatic control means, and means for varying the heating effect of the auxiliary heating means in accordance with the amount of deviation of the temperature to be controlled from the desired normal value to maintain the temperature to be controlled within narrower limits.

14. In a temperature control system, the combination of, a device to be positioned in a plurality of positions for controlling the value of the temperature to be controlled, thermostatic control means the state of which is varied in accordance with changes in the value of the temperature to be controlled, means, including follow up means operated by the device, controlled by said thermostatic control means to position said device in accordance with changes in the state of the thermostatic control means whereby the value of the temperature to be controlled is maintained within certain limits, auxiliary heating means for heating the thermostatic control means, and means controlled by the thermostatic control means for varying the heating effect of the auxiliary heating means in proportion to the amount of deviation of the temperature to be controlled from the desired normal value to maintain the temperature to be controlled within narrower limits.

JAMES SCARTH LOCKE.